US005268146A

United States Patent [19]

Lawrence et al.

[11] Patent Number: 5,268,146

[45] Date of Patent: Dec. 7, 1993

[54] FAST RESPONSE TEST PANEL

[75] Inventors: Paul J. Lawrence; Marian B. Buccafurni, both of Campbell; Leah P. Lawrence, San Jose, all of Calif.

[73] Assignee: Litmus Concepts, Inc., Santa Clara, Calif.

[21] Appl. No.: 858,179

[22] Filed: Mar. 25, 1992

[51] Int. Cl.$^5$ .......... G01N 31/22

[52] U.S. Cl. .......... 422/57; 422/58; 422/102

[58] Field of Search .......... 422/56-58, 422/61, 102

[56] References Cited

U.S. PATENT DOCUMENTS

| | | | |
|---|---|---|---|
| 3,663,374 | 5/1972 | Moyer et al. . | |
| 3,699,003 | 10/1972 | Kronish et al. . | |
| 4,046,513 | 9/1977 | Johnson . | |
| 4,175,923 | 11/1979 | Friend . | |
| 4,201,548 | 5/1980 | Tamaoku et al. . | |
| 4,235,964 | 11/1980 | Bochner | 435/34 |
| 4,336,337 | 6/1982 | Wallis et al. | 435/292 |
| 4,365,970 | 12/1982 | Lawrence et al. | 436/66 |
| 4,486,536 | 12/1984 | Baker et al. | 436/66 |
| 4,486,537 | 12/1984 | Koyama et al. | 436/170 |
| 4,495,291 | 1/1985 | Lawton | 436/1 |
| 4,543,338 | 9/1985 | Chen | 436/170 |
| 4,578,358 | 3/1986 | Oksman et al. | 436/66 |
| 4,605,629 | 8/1986 | Lange et al. | 436/166 |
| 4,649,121 | 3/1987 | Ismail et al. | 436/14 |
| 4,761,381 | 8/1988 | Blatt et al. | 422/57 X |

*Primary Examiner*—Jill A. Johnston

*Attorney, Agent, or Firm*—Townsend and Townsend Khourie and Crew

[57] ABSTRACT

A dry test panel for the testing of samples such as undiluted bodily fluid specimens is disclosed. The panel contains all reagents and components necessary to achieve a visible indication of the presence or absence of a suspect analyte in the sample, and preferred embodiments contain positive and negative controls as well. The device contains an internal chamber into which the specimen is introduced, and which contains all materials necessary for the reactions which produce a color change which is visible on the outer surface of the device. The materials are positioned in the chamber in such a manner that they are activated only when the chamber is filled with the specimen, and the color indicator is concentrated in a thin lamina immediately adjacent to a light-transmitting wall of the device so that a detectable color change occurs in a short period of time to produce a sensitive and yet fast test.

39 Claims, 2 Drawing Sheets

FAST RESPONSE TEST PANEL

BACKGROUND OF THE INVENTION

Analytical tests for clinical or veterinary purposes, as well as for food testing, health and safety, and other non-diagnostic purposes in commerical, residential and recreational environments, vary considerably in the chemistries and complexities involved. Some of these tests involve a series of reagents or other materials and multiple steps, and many require controls to assure the user that the test has been properly performed and the result obtained is accurate and reliable.

In tests involving wet chemistry techniques, various aspects of the tests contribute to making the tests expensive, time-consuming and vulnerable to error. In tests where several reagents are needed, certain reagents cannot be mixed in advance due to a tendency to slowly react even before the addition of the critical species which the test relies on to drive the reaction. Some reagents begin to decompose as soon as they are placed in solution. Other reagents are unstable upon exposure to air or to air-borne moisture. For these and similar reasons, many reagents must be kept in separate containers prior to use, others require refrigeration or must be prepared fresh for each use, and those unstable in air must be kept in air-tight containers. The storage, maintenance and handling of the chemicals must therefore be done carefully to preserve the integrity of the test.

The procedures required for wet chemistry techniques using multiple reagents are likewise often cumbersome and time-consuming. Aside from the awkwardness of manipulating several chemicals using appropriate vessels and transfer devices and performing a series of steps in sequence, other factors add to the time required. For example, the concentration of an analyte in a test sample is often low, particularly when the sample requires dilution before use. This is the case for instance in samples which are extracted from a clinical swab or other sampling device. Low concentrations require long incubation times, often as much as several hours, to achieve sufficient reaction for a detectable result. Precipitated analytes can be concentrated by centrifugation, but this requires centrifugation equipment and decanting. Long incubation times are often needed for visual indicators since a visual indicator is typically dissolved in a common reaction mixture with other reagents, and thus diluted, the indicator requires a long incubation before a visible change occurs. This limits the sensitivity of the test as well.

For certain tests, the cumbersome procedures of wet chemistry techniques have been circumvented by the development and use of dry test panels, which are frequently made of paper or similar materials impregnated with reagents and visual indicators. In most cases, these panels still require additional implements, however, such as a pipet to apply the sample to the panel. Additional reagents such as developing solutions are also often required. Dilution and other types of pretreatment of the specimen are also required in many cases before the specimen can be applied to the panel. The equipment and materials involved are thus often more than the panel itself, and require maintenance, storage and replenishment. In addition, dry test panels are available for only a limited variety of tests.

Controls are included in many test procedures to assure that the test components are functioning properly and that the test has been properly performed, and to assist the technician performing the test in differentiating between positive and negative results. In wet chemistry techniques, this generally requires blank tests run in parallel with the sample test, doubling or tripling the number of materials and manipulations which the technician must perform. This can be avoided to some extent in techniques involving dry panel indicators, but the reliability of the controls is sometimes compromised. Controls which are not designed to be activated at the time of the test are susceptible to deterioration during storage. Those which are activated at the time of the test generally require separate applications. Finally, controls proposed for some dry panels feature only a positive control. This limitation compromises test results and may result in undetected false positive test results.

These and other problems and disadvantages of the prior art are addressed by the present invention.

SUMMARY OF THE INVENTION

A dry, self-contained test device has now been developed which combines a visual indicator and one or more test reagents in dry form in a laminated panel with an internal chamber, the chamber being a void space until the sample is placed inside. For convenience, the parts of the panel and the locations of the functional chemicals in the panel will be described from a frame of reference in which the panel is in a horizontal position, since this is the most likely position which the panel will occupy during use. With the panel in this position, particularly for the preferred panels of this invention which are thin, flat structures, the sample will be placed in the chamber through an opening at the top of the panel. Of the laminae forming the panel, the uppermost lamina in this position, this lamina being the one through which the sample is introduced, will be referred to as the top lamina of the panel, the lower surface of this lamina forming the upper surface of the chamber. Likewise, the lowermost lamina of the panel will be referred to as the bottom lamina of the panel, the upper surface of this bottom lamina forming the lower surface of the chamber. The thin edges along the perimeters of these top and bottom laminae will be referred to as the side edges of the panel, and the thin lateral extremities of the chamber along the edges of its upper and lower surfaces will be referred to as the side walls of the chamber. Regions of any given surface which are adjacent to each other in the same horizontal plane will be referred to as horizontally adjacent, whereas lamina applied directly over other laminae to form parallel horizontal planes will be referred to as vertically adjacent.

The top lamins of the panel is fabricated of a light-transmitting, preferably transparent, material. The reagents, visual indicators and other components needed for the test are arranged in one or more laminae within the chamber, either as coatings on the upper surface of the chamber (i.e., on the lower surface of the light-transmitting wall), as coatings on the lower surface of the chamber, or on both. The reagents are those which induce a visible change, usually a color change, in the indicator in the presence of a selected analyte in the test sample. The lamina containing the visual indicator may be on the upper or lower surface of the chamber. One or more of the reagents may be included in the same lamina as the visual indicator, or in separate laminae on the same surface or on the opposite surface.

The reagents occupying the laminae may be selected such that all that is needed to complete the test is the addition of the sample plus a minimal number of additional reagents such as, for example, a developer. In particularly preferred embodiments, however, the laminae contain all reagents needed other than the sample, so that performance of the test requires nothing more than addition of the sample.

In certain preferred embodiments of the invention, the visual indicator is contained in the lamina applied directly underneath the light-transmitting wall. This lamina may contain one or more of the other reagents as well. In further preferred embodiments, however, the other reagents are in laminae separate from that of the visual indicator, these additional laminae being applied directly underneath the visual indicator lamina or over the lower surface of the chamber.

All laminae are solid layers prior to contact with the sample, and the lamina containing the visual indicator is preferably of a composition which is insoluble in the liquid sample for which the test is designed, so that the indicator remains in the lamina throughout the duration of the test. For samples in either aqueous or water-soluble either a visual indicator which is insoluble in water or a visual indicator held in a matrix which is insoluble in water. With the indicator thus retained in a thin concentrated lamina directly underneath the light-transmitting wall, a visible change in the indicator which is detectable through the light-transmitting wall occurs in a short period of time, resulting in both high sensitivity and a fast result.

This invention may be adapted and used for tests for a wide variety of analytes in test samples from a wide variety of sources, both biological and non-biological. A test may involve either a single reaction or a sequence of reactions culminating in a change in the visual indicator, and the number and types of reagents and reactions will accordingly vary from one test to the next. In some cases, best results are obtained when the pre-applied reacting species are distributed between the upper and lower surfaces of the chamber such that they are separated by a gap until the gap is filled with the test sample. In other cases, the reacting species may placed in a common lamina or in two or more distinct but vertically adjacent laminae on the upper or lower surface of the chamber with no loss in the reliability of the test. In all cases, however, the laminae are constituted and arranged such that the reactions which culminate in the visual indicator change occur only when the chamber is filled with the test sample, and such that when the visual indicator change does occur, it is at least concentrated in, and preferably restricted to, the lamina immediately adjacent to the light-transmitting wall.

In preferred embodiments of the invention, the test device includes a built-in positive control, a built-in negative control, or both, all of which are activated by the addition of a single specimen. The activation of these controls occurs simultaneously with the performance of the test, and visual indications (such as color changes or the lack thereof) representing both the controls and the test, are achieved with a single application of the specimen to the device and are visible through the light-transmitting wall. The controls occupy positions on the device which are horizontally adjacent to the test area, with appropriate indicia on the upper or lower surface of the device, preferably the upper, to identify the controls and differentiate them from the test. The controls themselves generally consist of further laminae containing reagents or other appropriate species which will either induce the visible change in the indicator by themselves or prevent the change from occurring, and will do so only when the test sample is present and yet independently of the presence or absence of the suspect analyte in the test sample. Again, the choice of these controls and the chemical mechanisms by which they function, as well as the choice between placing these laminae on the same surface of the chamber as the visual indicator or on the opposing surface, will vary from one test to the next.

Further preferred embodiments of the invention contain additional features to enhance the performance of the test. For water-based samples, the incorporation of a surface-active agent in the laminae immediately adjacent to the gap to be filled with the sample will promote the wetting of the laminae with the sample and the rapid and uniform filling of the chamber. The surface-active agent may be the sole functional ingredient in the lamina or combined in the lamina with test reagents. Preferably, both sides of the gap are lined with laminae bearing the surface-active agent. A sample introduction port is included in the device to permit direct insertion of the sample into the chamber, and preferred embodiments include one or more vent holes in the chamber, spaced apart from the sample introduction port, to further facilitate the filling of the chamber.

Other features, objects and advantages of the invention and its preferred embodiments will become apparent from the description which follows.

DETAILED DESCRIPTION OF THE INVENTION AND PREFERRED EMBODIMENTS

Figure 1:
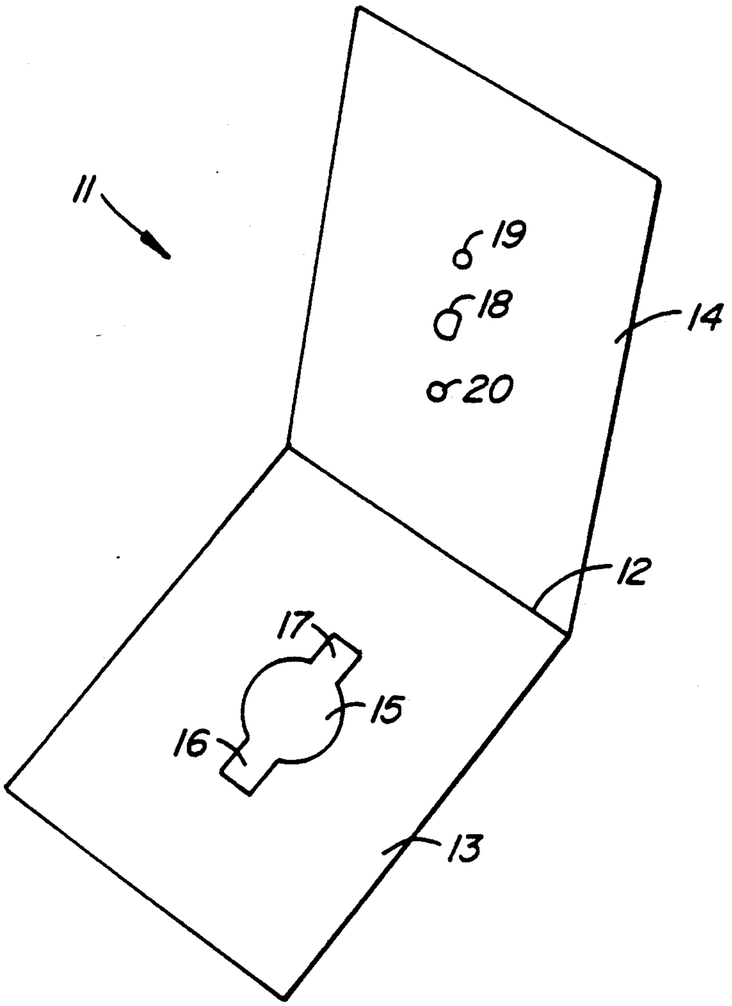
FIG. 1 is a view in perspective of an illustrative test device in accordance with the invention.

The test device of the present invention is a receptacle with an internal chamber lined with one or more laminae of solid reagents used in the test. Preferably, the laminae contain all reagents necessary for the test other than the specimen itself, these reagents including the visual indicator which is concentrated in a thin lamina visible through the light-transmitting wall. The components are arranged in the chamber in a manner which prevents them from producing a change in the indicator until the specimen is added.

The term "reagent" is used herein to denote any chemical species or mixture of species which takes part, either directly or indirectly, in the reaction scheme which results in, or prevents, the visual change which indicates a positive test result. Included among these reagents are the visual indicator, although at certain locations in this discussion the term "visual indicator" is used, to distinguish the indicator from other reagents. In cases of doubt, the intended scope of the terms will be evident from the context.

The receptacle is preferably flat and thin and of a size which can be easily held by hand. Accordingly, the chamber is preferably flat and shallow as well, with a width and length much greater than its depth, the depth being substantially constant. The chamber is preferably shallow enough to promote spontaneous wetting of the chamber walls with the specimen to achieve the maximum contact between the specimen and the dry reagent coatings on the upper and lower surfaces. This is of particular interest when reagent coatings are present on both the upper and lower surfaces of the chamber. In such cases, a small constant distance between these surfaces will also minimize the distance over which the reagents on the surface opposite that to which the visual indicator has been applied will need to diffuse in order to reach the indicator.

Within these considerations, the chamber depth is not critical to the invention and may vary. In most cases, a chamber ranging from about 3 mil to about 50 mil (0.003–0.050 inch; 0.0076–0.127 cm) in depth, preferably from about 5 mil to about 15 mil (0.005–0.0.015 inch; 0.0127–0.0381 cm), will give the best results. For any given depth, the lateral dimensions of the chamber (i.e., the spacing between its side walls) will define the size of the sample which the device will accommodate, and are otherwise unimportant except to define the size and shape of the visible test area on the outer surface of the device. The lateral dimensions should thus provide a test area which is large enough to be seen, and yet small enough that the chamber which will be completely filled by a specimen of reasonable size. The specimen size will vary with the type of specimen and its source and method of sampling, as well as the type of test being performed. In typical structures, it is contemplated that the lateral area of the chamber will range from about 0.1 $cm^2$ to about 10 $cm^2$, or preferably from about 0.3 $cm^2$ to about 3 $cm^2$. The internal volume of the chamber in typical structures will likewise vary, and for most types of samples, volumes ranging from about 3 $\mu L$ to about 300 $\mu L$ will be the most appropriate and convenient.

The test device is provided with a sample introduction port by which the specimen is placed in the chamber. The port is preferably in the same wall through which changes in the visual indicator are observed, i.e., the light-transmitting wall. The port will be shaped to accommodate the transfer device which is used to convey the sample from its source, and the port may thus be varied to suit any of various types of transfer devices which might be used. Examples of transfer devices are syringes, pipets, swabs and specula. Others will readily occur to those skilled in the art. A circular port is generally adequate, although for transfer devices such as swabs, the port may contain a straight edge along which the device can be scraped to more easily release the specimen.

Preferred embodiments of the test device contain additional features which further promote the fluid migration needed to fill the chamber and thereby place all reagents in contact with the specimen. One such feature is the inclusion of one or more vent holes in the chamber to permit the escape of air. The vent holes will be adequately distanced from the sample introduction port to maximize the surface area wetted by the specimen. In devices where specimen-activated positive and negative controls are included inside the chamber in positions horizontally adjacent to the test area, the vent holes will be arranged to assure that the specimen reaches both controls and fills them to avoid any false or ambiguous readings. As discussed below, one preferred arrangement of the device is the placement of the test area between the control areas such that the positive and negative control areas do not share a common boundary although each does share a common boundary with the test area. In this arrangement, the sample introduction port is most conveniently placed at a location in the wall directly above the test area, and one vent hole is placed above each of the two control areas at or near the outer extremities of these areas, thereby causing the specimen to fill first the test area and then both control areas.

Another feature promoting fluid migration in preferred embodiments of the invention is the placement of a surface-active agent along the interior surface of the chamber. The agent may be along one or the other of the upper and lower surfaces of the chamber, preferably both, and may be included as a dry solute in a support matrix comprising the innermost lamina or coating on the surface. In some cases, the lamina will also contain one or more reagents taking part in the test reactions. In other cases, the surface-active agent will be the sole functional component of the lamina.

Surface-active agents will be useful for specimens which are water-based, as most biological specimens are. Suitable surface-active agents will be those which can be rendered in solid form, and a wide variety of substances which have a surface-active effect may be used. The substances will generally be detergents, wetting agents or emulsifiers, and will vary widely in chemical structure and electronic character, including anionic, cationic, zwitterionic and nonionic substances. Examples are alkyl-alkoxy sulfates, alkyl aryl sulfonates, glycerol fatty acid esters, lanolin-based derivatives, polyoxyethylene alkyl phenols, polyoxyethylene amines, polyoxyethylene fatty acids and esters, polyoxyethylene fatty alcohols and ethers, p fatty acids and esters, polyoxyethylene fatty esters and oils, polyoxypropylene/polyoxyethylene condensates and block polymers, sorbitan fatty acid esters, sulfo derivatives of succinates, and cholic acid derivatives. Trade names of products falling within some of these classes are Lubrol, Brij, Tween, Tergitol, Igepal, Triton, Teepol and many others.

As indicated above, the essential function of the test device is to produce a change in the visual indicator which is activated by the specimen and indicates or relies on either the presence or absence of a suspect analyte in the specimen. The specimen provides the contact or initiates, either directly or indirectly, the interaction between the reagents retained in the solid laminae or coatings on the interior chamber walls which are necessary to produce the visible change, and thereby provides the opportunity for the change to occur. Depending on the analyte and the chemistry involved in producing the visible change, a positive indication of the presence of the analyte may be either a visible color or other visible change, or a lack of color or other visible change, with a negative indication being the opposite. The change, or opportunity for change, may be the result of a single chemical reaction in the visual indicator brought about by contact with the specimen, or it may be the end result of a series of reactions initiated by the contact of one or more of the reagents with the specimen. This will vary with the analyte, the reaction or reaction sequence, and the indicator.

The visual indicator may be any chemical species which undergoes a visually detectable change as the result of the reaction or as the culmination of the reaction sequence occurring in the chamber of the test device when the analyte is present in the specimen. Preferred indicators are those in which the visible change is a change in color, including the formation of color in an otherwise colorless material, upon exposure to a chemical species. The most appropriate indicator for any given analyte will depend on the reaction or reactions which the analyte is capable of initiating in the chamber, and the selection in any given case will be readily apparent to those skilled in the art. A wide variety of color indicators, chromogens, and other species with a similar effect may be used. Examples are methyl violet, metanil yellow, metacresol purple, p-xylenol blue, thymol blue, tropaeolin, benzopurpurine 4B, quinaldine red, 2,4-dinitrophenol, methyl yellow, bromphenol blue, tetrabromophenol blue, Congo red, methyl orange, brom-chlorphenol blue, p-ethoxychrysoidine, α-naphthyl red, sodium alizarin sulfonate, bromcresol green, 2,5-dinitrophenol, amaranth red, methyl red, chlorophenol red, benzoyl auramine G, azolitmin, Coomassie blue, bromcresol purple, bromphenol red, dibromophenoltetrabromophenolsulfonaphthalein, p-nitrophenol, bromothymol blue, phenol red, quinoline blue, cresol red, α-naphtholphthalein, metacresol purple, ethyl bis(2,4-dinitrophenyl)acetate, thymol blue, o-cresolphthalein, phenolphthalein, thymolphthalein, alizarin yellow, red garnet and indigo carmine, guaiac, tetramethylbenzidine, 2,2'-azino-bis(ethylbenzylthiazoline-6-sulfonic acid), fast garnet, 4-aminoantipyrine, 5,5'-dithio-2-nitrobenzoic acid, α-naphthol, phenazine methosulfate and tetranitroblue tetrazolium.

In most cases, the presence of the analyte will result in a visible change in the indicator, and this visible change will be the end result of the reaction of the analyte with at least one reagent other than the visual indicator. The reaction may for example cause the reagent to release a reaction product which reacts with the indicator to produce the change. Since the system requires the presence of the analyte for initiation of the reaction sequence, the reagent and the indicator may thus be combined in the same lamina. In many cases with this type of reaction mechanism, however, it is preferable that the indicator and the reagent be kept in two distinct laminae. This will permit a high concentration of the indicator in the lamina adjacent to the wall, and will permit the use of a very thin and highly concentrated lamina for the indicator, thereby increasing the speed of the indicator response.

Isolation of the indicator in a separate lamina will also often prevent the occurrence of any gradual change in the indicator during storage which might occur as the result of contact with the reagent even in the absence of the analyte. Many indicators are susceptible to such gradual changes. A typical example of such a reaction is a analyte-initiated cleavage of the reagent to release a species which quickly interacts with the indicator when released, but which also interacts with the indicator, although at a much slower rate, when still bound to the reagent residue. In most cases of this type, premature changes in the indicator are prevented by placing the indicator and the reagent in two separate laminae. The reagent lamina may be applied directly over the indicator lamina in vertically adjacent manner with the two in full contact although distinct and separate laminae. Alternatively, one of the two laminae may be applied to the upper surface of the chamber and the other to the lower with the air gap in between, such that contact between the reagent and the indicator occurs only when the specimen is present, due to the reagent or the released species diffusing through the specimen. In some cases, separation of the laminae by the air gap may be necessary in order to avoid a premature visible change. Situations in which this is true will be readily apparent to those skilled in the art. When two or more reagent laminae other than the indicator lamina are present, the reagent laminae may both be applied to the upper surface of the chamber (i.e., the surface to which the indicator lamina is applied), both applied to the lower surface, or one applied to each.

Formation of the solid laminae, both indicator and reagent laminae, may be done by applying the lamina material in liquid form followed by drying or other solidification. The liquid form of the substance may for example be a solution or an uncured liquid state of the substance, and the solidification step may thus be an evaporation of the solvent or a curing of the substance. The substance of interest may be combined with additional materials for any of a variety of purposes, such as for example:

(1) to facilitate the application of the liquid to the surface by modifying the viscosity of the liquid, (2) to help form a continuous smooth solid layer which remains uniform and does not disintegrate or granulate over time or upon the application of additional layers over it, (3) to modify the solubility of the layer with solvents used in layers to be applied over it or to make the layer soluble in solvents which do not dissolve layers applied underneath, or all of these at the same time. Soluble polymeric materials are preferred additives to serve one or all of these purposes. Examples are cellulose and various cellulose derivatives, with the substitutions appropriately selected to achieve the desired solubility characteristics. For those test devices designed for aqueous or other water-based samples, the visual indicator lamina preferably contains the visual indicator retained in a matrix of solid material which is insoluble in water. This prevents the indicator from migrating out of the lamina and away from the light-transmitting surface. Occasionally, however, the indicator itself is insoluble in water and will by itself form a coherent lamina which will remain intact.

For those embodiments of the invention in which a positive control indicator, a negative control indicator or both are included in the device, one or more additional reagents will be included for each control. These additional reagents will either be incorporated with one of the existing laminae in a horizontally defined portion of that lamina or applied as a separate, vertically adjacent lamina over a horizontally defined portion of the existing lamina. By virtue of their position in the chamber, therefore, these additional reagents define control areas which are horizontally separated from each other and from the test area.

The selection of an appropriate reagent for a positive or negative control will depend on the analyte toward which the overall test is directed, the type of indicator used to detect the presence of the analyte, and whether the reagent is intended to serve as a positive control or a negative control. By utilizing known chemistries, the selection of an appropriate reagent will in most cases be apparent to those skilled in the art. The reagent for a positive control, for example, may be a sample of the analyte itself, an analogue of the analyte, or any other species with a parallel mode of action which initiates or induces the reaction or reaction sequence which culminates in the visible change in the visual indicator. The lamina containing this reagent will be on either the upper or lower surface of the chamber provided that the reagent will not initiate or induce the visible change until the specimen is present, but will do so independently of the presence or absence of the analyte in the specimen. The reagent for a negative control may likewise be an inhibiting species such as a denaturing, inhibiting or otherwise inactivating agent which prevents or blocks the reaction or reaction sequence, and thereby prevents the visible change from occurring regardless of whether or not the analyte is present.

Both controls are activated when the specimen is applied to the test device. In some cases, this is achieved most effectively by placing the control reagents in laminae on the same surface as the lamina(e) containing the other reagent(s). In others, best results are achieved when the control reagents are placed in laminae on the chamber surface opposite that which bears the other reagent(s), such that the control reagent and the remaining reagent(s) are separated by the air gap. In preferred embodiments, the control areas of the device will contain all components and reagents used in the test area with the addition of the control reagents, either incorporated in horizontally delineated sections of one or more of the same laminae used in the test area or applied as separate laminae over such horizontally delineated sections. To achieve sharp boundaries for the control areas and to prevent the control reagents from activating or deactivating the test area, it is often beneficial to place discontinuities in the laminae at the boundaries separating the control areas from the test area to minimize or eliminate the possibility of lateral diffusion of the control reagents out of their respective control areas. These discontinuities may be in laminae along the upper surface, the lower surface, or both.

As indicated above, the controls are preferably activated by the same specimen sample used for the test. This is conveniently done by arranging the control areas as extensions of the test area, all contained in the same chamber in the test device, with unobstructed fluid communication between the various areas. In preferred embodiments where both positive and negative control areas are included, the control areas are isolated from each other by the test area which is positioned in between the two. Filling of all areas with a single application can be accomplished with the arrangement of the sample introduction port and vent holes described above. Since the visible changes, or absence thereof, are visible through the light-transmitting wall of the device, the identification of areas as positive and negative controls is conveniently achieved by placing appropriate indicia on the outer surface of the device.

The test device of the present invention is highly versatile and can be used for a wide range of assays and chemical reactions, depending on the particular analyte whose presence or absence is sought to be determined. The reagents occupying the laminae in the test device may thus be enzymes, co-factors, enzyme substrates such as cleavable conjugates, proteins and smaller organic molecules, and organic reagents in general. Likewise, the reaction which the analyte initiates in, or undergoes with, the reagent may be an enzymatic or nonenzymatic reaction such as a hydrolysis or other type of cleavage, an oxidation reaction, a reduction reaction, or any of a wide array of other types of reactions.

The light-transmitting wall may be any material which is inert and sufficiently rigid to support the visual indicator lamina, and yet sufficiently transmissive of light to show the change in the visual indicator as soon as it occurs. Translucent or transparent materials, preferably nonabsorptive, may be used; transparent materials are preferred. Examples of transparent polymeric materials suitable for this use are polyethylene terephthalates (such as Mylar, for example) and polycarbonates (such as Lexan, for example). The opposing (bottom) wall of the device may likewise be made of transparent or translucent material, although it may also be of opaque material since visualization of the test results as well as the positive and negative controls is required only from one side of the device. When the bottom wall is transparent, visualization of the visible change in the test area, control areas or both through the top wall can be enhanced by applying a printing or coating to either surface of the bottom wall with a colored or reflective material to heighten the color contrast.

The device may be formed in a variety of ways. Sheets of polymeric material may be laminated together, with appropriate cutouts to define the shape of the chamber and holes for the sample introduction port and the vent holes. The depth of the chamber as well as its shape and lateral dimensions will then be defined by the thickness of the central sheet, while the placement of the holes will be controlled by the top sheet. The indicator and reagent coatings may be applied to the top sheet, bottom sheet or both, as required, before the sheets are assembled into the laminate. The sheets may then be secured together by any conventional means, such as heat sealing or the use of adhesives.

A particularly preferred method of forming the device is by the use of a single sheet of transparent or otherwise light-transmitting polymeric material, with a section of the sheet embossed or otherwise processed, mechanically or chemically, to contain a depression or indentation of constant depth in the inner surface of the chamber. The depression is located on one half of the sheet, with the holes for sample introduction and venting on the other half. The indicator and reagent coatings are applied at appropriate locations on the sheet, and the half containing the holes is then folded over the other half to form the enclosed chamber and achieve correct alignment of the areas representing the upper and lower surfaces of the chamber. The facing surfaces of the sheet are bonded together as in the laminate of the preceding paragraph.

A preferred method for bonding the two halves together is through the use of a heat-sensitive, pressure-sensitive, water-based or solvent-based adhesive. The adhesive may be restricted to the areas peripheral to the chamber to avoid contact with the test reagents, or it may cover the entire surface of the sheet, having been applied prior to application of the indicator and reagent coatings. In the latter case, appropriate adhesives will be those which are transparent, inert, wettable by, and otherwise compatible with the layers to be applied over it. Many types of adhesives suitable for this application exist, and the most appropriate choice will vary from one system to the next depending on the layers to be applied above it.

While the invention is not intended to be limited to any particular construction of a test device, the attached Figures, which are not drawn to scale, illustrate how one such device may be constructed.

FIG. 1 depicts the support structure of the device in a perspective view, prior to the indicator and reagents being applied and the chamber being enclosed. The support structure consists of a single sheet 11 of relatively stiff, transparent, chemically inert plastic material, with a score line 12 defining a fold separating the sheet into two halves 13, 14, each having the same length and width. The lower half 13 contains an indentation of a composite shape consisting of a circle 15 at the center with two rectangular extensions 16, 17 extending to opposite sides. The upper half 14 contains three holes including a central hole 18 which serves as the sample introduction port, and two sides holes 19, 20 which serve as vent holes. The two vent holes 19, 20 are circular, while the sample introduction port 18 is circular with one straight edge to facilitate scraping of the specimen from the swab which is used as a transfer device. The holes are positioned such that when the plastic is folded at the score line 12 and the top half 14 is placed in contact with the bottom half 13, the sample introduction port 18 is above the center of the circular part 15 of the indentation, and the vent holes 19, 20 are above the two rectangular extensions 16, 17 at the outermost edge of each. The two rectangular extensions 16, 17 represent the positive and negative control areas of the device.

Many variations of the device of FIG. 1 may be made. The two halves 13, 14 may be of differing lengths, widths or both for various reasons. The only critical feature is that the indentations in the lower half and the holes in the upper half be positioned relative to the score line such that the holes and indentations are in proper registration when the two halves are folded at the score line. As another example, the rectangular extensions 16, 17 in the lower half of the structure may terminate in circular (or half-circular) areas to match the vent holes 19, 20 in the top half. The vent holes themselves may be of any shape. In fact, vent holes which are shaped differently from the sample introduction hole 18 have the advantage of preventing user confusion as to where to introduce the sample.

Figure 2:
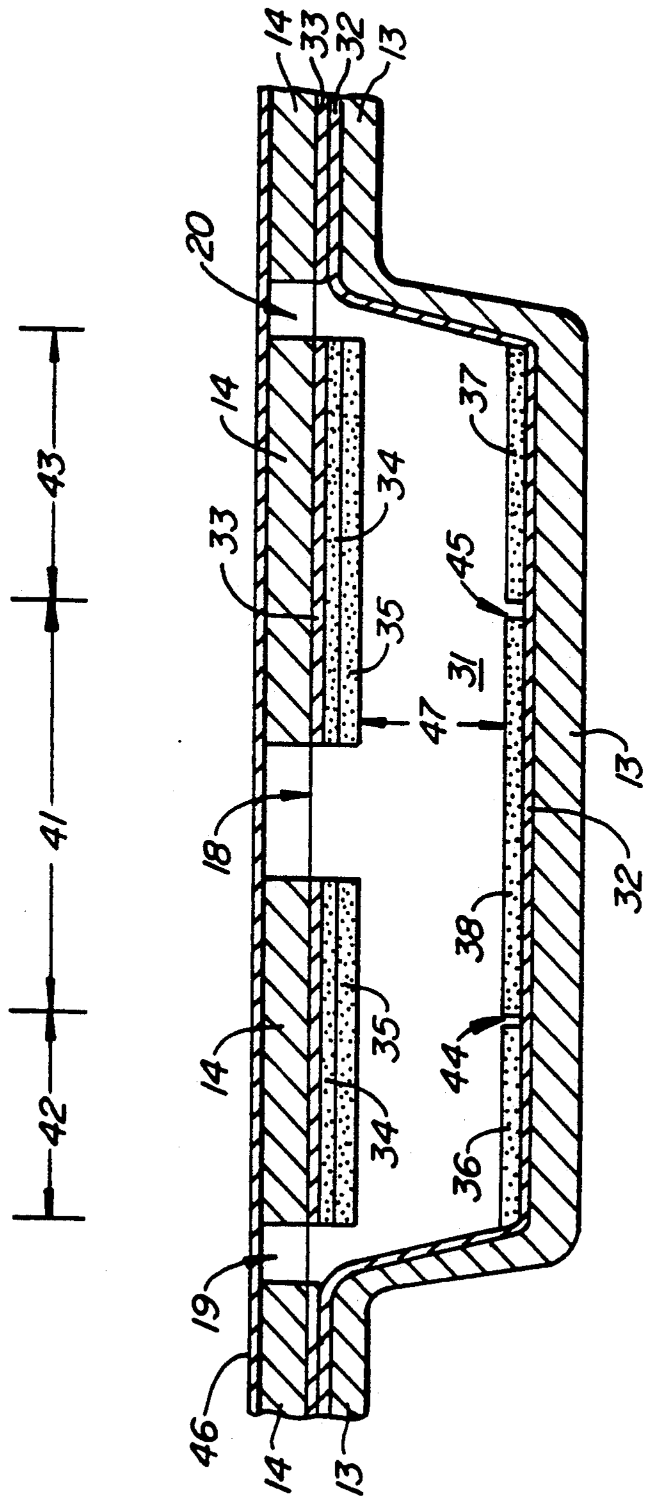
FIG. 2 is a side view in cutaway of a portion of the test device shown in FIG. 1.

FIG. 2 is a side cutaway view of the device of FIG. 1, showing the chamber 31 in cutaway after the coatings have been applied and the two halves folded over and sealed to one another. The inner surfaces of each of the two halves 13, 14 of the transparent polymer are coated with an adhesive 32, 33, respectively. Directly underneath the upper adhesive layer 33 is the layer containing the color indicator 34, and beneath the latter is a layer of reagent 35. It will be noted that both the color indicator layer 34 and the reagent layer 35 extend the full length and width of the chamber, surrounding the sample introduction port 18 and extending into all areas of the chamber.

The test and control areas of the chamber are defined by the horizontal locations of the coatings on the lower wall 13 of the chamber. A reagent for the negative control is contained in one coating 36 which occupies the lower surface of one of the two rectangular extensions 16 of the chamber (see FIG. 1), and a reagent for the positive control is contained in a second coating 37 similarly situated in the other rectangular extension 17. Alternatively, reagents for the controls may be placed on the upper surface of the chamber rather than the lower. This is in fact preferred for certain assays. The portion of the lower surface under the central circular portion 15 of the chamber is coated with a layer 38 which may either contain an additional reagent used in the test reaction or no reagent at all. Thus, as viewed from the top of the closed device, the circular test area 41 is flanked by a rectangular negative control area 42 and a rectangular positive control area 43. The three segments 36, 37, 38 are separated by gaps or discontinuities 44, 45 to prevent diffusion between, or contact of, the contents of these segments. Similar discontinuities may also be placed in either or both of the color indicator and reagent layers 34, 35, directly above the discontinuities 44, 45 in the lower layer. The discontinuities in the color indicator and reagent layers will further prevent diffusion of control components or other reagents from the control areas into the test area. The most inward-facing of the layers 35, 36, 37, 38 all contain, in addition to any reagents present, a wetting agent or detergent to promote the rapid and complete spreading of the specimen along the upper and lower surfaces to fill the chamber. In some cases, the same effect is achieved by a layer of protein.

In certain embodiments of the invention, the reagents tend to deteriorate upon prolonged exposure to air or to air-borne moisture. In the device shown in FIG. 2, this is prevented by a thin sheet of material 46 which is both moisture-impermeable and air-impermeable. The sheet covers the sample injection port and both vent holes, sealing the chamber interior from the environment until the device is ready for use, whereupon the sheet is readily peeled off. For materials which are particularly water-sensitive or air-sensitive, it may also be desirable to place a moisture- and air-impermeable sheet on the bottom of the device, the sheet being either permanently attached or capable of being peeled off. Further protection against moisture and air can be achieved by placing the device in a pouch which completely surrounds the device.

As indicated above, each of the dimensions of the device shown in these Figures may vary, as may their arrangement and shape. A typical example, however, is one in which the support sheet is Mylar 5 mil in thickness (0.005 inch, 0.0127 cm), and adhesive layer is low density polyethylene 2 mil in thickness (0.002 inch, 0.0051 cm), the gap width 47 is 7.5 mil (0.0075 inch, 0.019 cm), the test area is a circle 5/16 inch in diameter (area: 0.0766 square inch, 0.494 $cm^2$), and the negative and positive control areas each measure ⅛ inch × 1/16 inch (area: 0.0078 square inch, 0.0504 $cm^2$). The air vents in this example are each circular, and they and the sample introduction port are each ⅛ inch (0.32 cm) in diameter. The chamber volume is approximately 12 $\mu L$.

The test device of the present invention is useful for testing samples from a wide range of sources, including biological sources and otherwise. Bodily fluids such as blood, serum, plasma, urine, urethral discharge, tears, vaginal fluid, cervical exudate, spinal fluid and saliva, as well as non-bodily fluids such as foods, pond or swimming pool water and liquid wastes are examples. The analyte may be any species sought to be detected, i.e., indicative of a condition whose existence or lack thereof is sought to be determined. Analytes may thus be organic compounds, inorganic compounds, enzymes, cofactors, proteins of various kinds, viruses, microorganisms, and any other species which might be present in a sample.

The foregoing is offered primarily for purposes of illustration. It will be readily apparent to those skilled in the art that the materials, configurations and other parameters of the device as it is described herein may be further modified or substituted in various ways without departing from the spirit and scope of the invention.

What is claimed is:

1. A test device for testing a sample for the presence of an analyte, said test device comprising:

a receptacle defined at least in part by first and second opposing walls having interior-facing surfaces with a gap therebetween, said first wall being of a light-transmitting material;

a visual indicator contained in a solid layer on the interior-facing surface of said first wall, said visual indicator being one which is susceptible to a visible change upon the occurrence of a chemical reaction;

a reagent contained in a solid layer on the interior-facing surface of said second wall, said reagent being one which induces said chemical reaction in said visual indicator; and an opening in said receptacle for introduction of said sample.

2. A test device in accordance with claim 1 in which said opening is in said first wall.

3. A test device in accordance with claim 1 further comprising a positive control species contained in a solid layer on a portion of the interior-facing surface of one of said first and second walls, said positive control species selected such that, when contacted by said sample, said positive control species causes said reagent to induce said chemical reaction in said visual indicator independently of the presence or absence of said analyte in said sample.

4. A test device in accordance with claim 1 further comprising a negative control species contained in a solid layer on a portion of the interior-facing surface of one of said first and second walls, said negative control species selected such that, when contacted by said sample, said negative control species prevents said chemical reaction from occurring, regardless of the presence or absence of said analyte in said sample.

5. A test device in accordance with claim 1 further comprising:

(a) a positive control species contained in a solid layer on a first portion of the interior-facing surface of one of said first and second walls, said positive control species selected such that, when contacted by said sample, said positive control species causes said reagent to induce said chemical reaction in said visual indicator independently of the presence or absence of said analyte in said sample; and (b) a negative control species contained in a solid layer on a second portion of the interior-facing surface of one of said first and second walls, said negative control species selected such that, when contacted by said sample, said negative control species prevents said chemical reaction from occurring, regardless of the presence or absence of said analyte in said sample.

6. A test device for testing a sample for the presence of an analyte, said test device comprising:

a receptacle defined at least in part by first and second opposing walls having interior-facing surfaces with a gap therebetween, said first wall being of a light-transmitting material;

a first solid layer coated on the interior-facing surface of said first wall, said first solid layer containing a visual indicator susceptible to a visible change upon the occurrence of a chemical reaction;

a second solid layer coated on the interior facing-surface of said second wall, said second solid layer containing a reagent which, when in the presence of said analyte, induces said chemical reaction in said visual indicator; and an opening in said receptacle for introduction of said sample.

7. A test device in accordance with claim 6, further comprising a third solid layer adjacent to said gap, on the opposite side of said gap from, and facing a limited portion of, said second solid layer, said third solid layer containing a positive control species which contacts said reagent when said gap is filled with said sample and, when so contacting said reagent, causes said reagent to induce said chemical reaction in said visual indicator, independently of the presence or absence of said analyte in said sample.

8. A test device in accordance with claim 6, further comprising a third solid layer adjacent to said gap, on the opposite side of said gap from, and facing a limited portion of, said second solid layer, said third solid layer containing a negative control species which, when said gap is filled with said sample, prevents said chemical reaction from occurring, regardless of the presence or absence of said analyte in said sample.

9. A test device in accordance with claim 6 in which said first solid layer is non-water-soluble.

10. A test device in accordance with claim 6 further comprising vent means for venting said receptacle to facilitate the introduction of said sample into said receptacle through said opening.

11. A test device in accordance with claim 6 in which the interior-facing surface of at least one of said first and second walls is coated with a solid, surface-active-agent-containing layer adjacent to said gap.

12. A test device in accordance with claim 6 in which the interior-facing surfaces of both said first and second walls are coated with solid, surface-active-agent-containing layers adjacent to said gap.

13. A test device in accordance with claim 6 in which said opening is in said first wall.

14. A test device in accordance with claim 6 in which said first wall is of transparent material.

15. A test device in accordance with claim 6 further comprising an air-impermeable sheet removably adhered to the exterior of said receptacle, sealing said opening.

16. A test device for testing a sample for the presence of an analyte, said test device comprising:

a receptacle defined at least in part by first and second opposing walls having interior-facing surfaces with a gap therebetween, said first wall being of a light-transmitting material, said first and second opposing walls enclosing a chamber comprised of three regions arranged laterally relative to said first and second opposing walls, said three regions defined as a test region, a positive control region and a negative control region, respectively;

a first solid layer coated on the interior-facing surface of said first wall, said first solid layer containing a visual indicator susceptible to a visible change upon the occurrence of a chemical reaction;

a second solid layer comprising a member selected from the group consisting of:

(a) a coating over said first solid layer, and (b) a coating over the interior-facing surface of said second wall;

said second solid layer containing a reagent which, when in the presence of said analyte, induces said chemical reaction in said visual indicator;

a third solid layer on the interior-facing surface of one of said first and second opposing walls, contained within said positive control region, said third solid layer adjacent to said gap and on the opposite side of said gap from said second solid layer, said third solid layer containing a positive control species which contacts said reagent when said gap is filled with said sample and, when so contacting said reagent, causes said reagent to induce said chemical reaction in said visual indicator, independently of the presence or absence of said analyte in said sample; and a fourth solid layer on the interior-facing surface of one of said first and second opposing walls, contained within said negative control region, said fourth solid layer adjacent to said gap, on the opposite side of said gap from said second solid layer, said fourth solid layer containing a negative control species which, when said gap is filled with said sample, prevents said chemical reaction in said visual indicator from occurring, regardless of the presence or absence of said analyte in said sample; and a sample port in said receptacle for introduction of said sample.

17. A test device in accordance with claim 16 in which said sample port is in said first wall.

18. A test device in accordance with claim 16 in which said sample port opens into said test region.

19. A test device in accordance with claim 16 in which said positive control region and said negative control region are each contiguous with said test region.

20. A test device in accordance with claim 16 in which said test region separates said positive control region and said negative control region.

21. A test device in accordance with claim 16 in which said test region separates said positive control region and said negative control region, and said sample port opens into said test region.

22. A test device in accordance with claim 16 in which said second solid layer is a coating over the interior-facing surface of said second wall.

23. A test device in accordance with claim 16 in which said first wall is of transparent material.

24. A test device in accordance with claim 16 in which the interior-facing surface of at least one of said first and second walls is coated with a solid, surface-active-agent-containing layer adjacent to said gap.

25. A test device in accordance with claim 16 in which the interior-facing surfaces of both said first and second walls are coated with solid, surface-active-agent-containing layers adjacent to said gap.

26. A test device in accordance with claim 16 in which said third and fourth solid layers occupy discrete regions on the interior-facing surface of said second wall.

27. A test device in accordance with claim 16 in which said second, third and fourth solid layers occupy discrete regions on the interior-facing surface of said second wall.

28. A test device in accordance with claim 16 in which said first solid layer is non-water-soluble.

29. A test device in accordance with claim 16 further comprising vent means for venting said receptacle to facilitate the introduction of said sample into said receptacle through said sample port.

30. A test device in accordance with claim 16 in which said test region separates said positive control region and said negative control region, said sample port opens into said test region, and said test device further comprises a first vent port in said positive control region and second vent port in said negative control region.

31. A test device in accordance with claim 16 in which said test region separates said positive control region and said negative control region, said sample port opens into said test region, said test device further comprises a first vent port in said positive control region and a second vent port in said negative control region, and the interior-facing surfaces of both said first and second walls are coated with solid, surface-active-agent-containing layers adjacent to said gap.

32. A test device in accordance with claim 16 in which said gap is of width ranging from about 3 mil to about 50 mil.

33. A test device in accordance with claim 16 in which said gap is of width ranging from about 5 mil to about 15 mil.

34. A test device in accordance with claim 16 in which said first, second, third and fourth solid layers are each of a thickness of less than about 100 microns.

35. A test device in accordance with claim 16 in which said receptacle has an internal volume of from about 2 $\mu L$ to about 1,000 $\mu L$.

36. A test device in accordance with claim 16 in which said sample port comprises an opening with at least one straight edge.

37. A test device in accordance with claim 16 in which said test region, said positive control region and said negative control regions each occupy less than about 5 $cm^2$ of said first wall.

38. A test device in accordance with claim 16 in which said test region, said positive control region and said negative control regions each occupy less than about 1 $cm^2$ of said first wall.

39. A test device in accordance with claim 16 further comprising an air-impermeable sheet removably adhered to the exterior of said receptacle, sealing said opening.

* * * * *